Patented June 3, 1947

2,421,609

UNITED STATES PATENT OFFICE 2,421,609

THIRD-DIMENSIONAL PICTURES AND THIRD-DIMENSIONAL PORTRAYAL OF ANATOMY AND SURGERY

Louis P. Good, Texarkana, Ark.

No Drawing. Application February 22, 1944, Serial No. 523,478

11 Claims. (Cl. 35—17)

This invention relates to the portrayal of anatomy and surgery in the third dimension and to third-dimensional pictures adapted to be used for that and other purposes.

Heretofore anatomy and surgery have been commonly depicted by various two-dimensional media, such as drawings, charts and photographs; portrayal in the third dimension has been effected only by the use of bas reliefs, cast or molded figures and stereoscopic means of the well known form consisting of two complementary pictures disposed side by side and viewed through a common stereoscope. Some of these methods have been found so cumbersome and inconvenient as to be of little value.

One of the principal objects of this invention is to portray anatomy and surgery in the third dimension by a single unitary print or picture on a single flat or substantially flat sheet of paper or other substantially flat surface.

Another of the objects of the invention is the third-dimensional portrayal of anatomy and surgery in such manner and form as to set out in bold relief on a single print or picture the various features of the body, such as the nerves, blood vessels, tendons and other important structures.

A further object of the invention is to provide a method and means by which selected parts or features of pictures portraying objects in the third dimension may be made to appear in strikingly bold relief on a single flat or substantially flat print, such method and means, although primarily designed and intended for use in the portrayal and demonstration of anatomy and surgery, being adapted for similar use in connection with dentistry, botany, geology and various other fields.

A still further object is the production of third-dimensional pictures in such shape and form as to be capable of projection upon a screen for displaying third-dimensional views to an audience.

The method of portrayal of anatomy and surgery which constitutes an important part of my invention consists in producing the third-dimensional reproduction as a single picture on a single sheet of paper or like material, which can be bound in a book or filed in loose-leaf form in the same manner as any ordinary page or sheet. This picture requires no bulky viewing apparatus and is convenient and practical for use by medical students and other members of the medical and surgical professions.

The pictures by means of which my third-dimensional portrayal of anatomy and surgery is carried out may be produced by various processes, but I prefer to make them by the general process described in Patents Nos. 1,386,720, August 9, 1921; 1,498,743, June 24, 1924; and 1,592,034, July 13, 1926, to Alfred J. Macy, which patents describe a complementary color process involving printing two views in complementary colors (for example, red and blue) one over the other and slightly out of register, the respective views being taken from separated view points, the resulting picture to be viewed stereoscopically through complementarily colored filters of substantially the same colors as the colors of the complementary superimposed views. When viewing the picture through the colored filters each eye sees only one of the complementary views of the picture, the result being a third-dimensional effect. The final view is black (or grey) and white.

As an extension of and improvement upon the above-mentioned Macy process of producing stereoscopic pictures and as an adjunct to and improvement of my method of portraying anatomy and surgery in the third dimension, I incorporate in the third-dimensional picture an additional color or colors of such character and so applied in the course of making the picture as to cause the selected objects or parts to which such additional color is applied to appear in such added color or colors in strong contrast to the rest of the picture, when viewed through the color filters or screens of the third-dimensional viewing means.

The specific methods preferably employed and others capable of use in practising my invention will be apparent from the following description, from which various objects and advantages in addition to those mentioned above will be understood and appreciated.

My preferred method of producing the third-dimensional pictures used in the portrayal of anatomy and surgery is similar to the general method described in the above-mentioned Macy patents. Two pictures of a well-illuminated specimen or stage of an operative procedure selected for portrayal are taken with a stereoscopic camera having matched lenses or with two cameras having similar lenses, synchronized for time and shutter opening and with diaphragm openings spaced apart the proper interpupillary distance. One camera takes a picture of the view as seen by the right eye; the other camera preferably simultaneously takes the same view as seen by the left eye.

A separate plate of each of the (right-eye and left-eye) views is made. An impression or print of one of the views is then made and the other view is superimposed upon it. For example, a print of the right-eye view is made in red and allowed to dry; the left-eye view in blue is then superimposed upon the red (right-eye) view in proper relation with it, i. e., slightly out of exact register, but with the degree of registration requisite for composite superimposed-view stereoscopic pictures to be viewed through screens or filters of the general character of those exemplified by the devices disclosed in Macy Patents Nos. 1,498,743 and 1,533,437.

In viewing the above-described composite superimposed-view picture through such color filters the right-eye filter should be blue and the left-eye filter red; the right-eye blue filter filters out the blue view as seen by the left eye and the left-eye red filter filters out the red view as seen by the sight eye. The resulting view seen through the filters is the same as would be obtained by looking at the object with both eyes or at an ordinary stereoscopic picture of the object through a common stereoscope. As viewed through the color filters the picture is substantially in black or grey.

Instead of red and blue any other pair of complementary colors may be used.

Third-dimensional pictures prepared and viewed in accordance with this general method I have found to be advantageous in the portrayal of anatomy and surgery. Pictures made by this method on a single flat sheet are easier to prepare; more convenient for use in filing and for reference, since they may be assembled in looseleaf or book form; and more realistic and efficacious as a medium of portrayal or demonstration than any of the means, such as hand-drawn charts and bas reliefs, heretofore used for that purpose.

The benefits and advantages derived from the use of this method of portraying anatomy and surgery, either as a means of, or as an aid in, instruction of demonstration, are considerable, as will be appreciated by members of the medical and surgical professions and others familiar with such matters.

In order to enhance the value of the above-described method of portraying or depicting anatomy and surgery I have devised an improvement which adds to the emphasis given to individual elements of the specimen by the third-dimensional treatment an even more marked individuality and outstanding character. The new effect is produced by the application of an additional color or colors in a certain particular manner to the composite superimposed-view third-dimensional picture, as hereinbefore mentioned.

The incorporation of the additional color or colors in the third-dimensional picture in the manner which will now be described constitutes an improvement upon the method of making stereoscopic pictures described in the above-mentioned Macy patents, and likewise an improvement in my method of portraying anatomy and surgery in the third dimension.

The added color or colors are and must be introduced in a manner which does not destroy the third-dimensional value of the picture. The work must be done accurately and the additional color or colors to be incorporated must be selected and applied in accordance with certain definite requirements for the production of the desired color indications in selected parts of the picture, as viewed through the color screens.

By my preferred procedure an additional plate is used in the production of the composite picture for each additional color incorporated into the final picture. A print of one of the views (right-eye view or left-eye view) is made on a flat surface, such as a sheet of paper; the part which is to appear in color is accurately outlined on that print; this area is then filled in solidly with India ink; and by means of a separate plate there is made an accurate printed reproduction of the blocked-out area with that area in the identical relative location as in the view used as the basis for the blocking-out operation.

If more than one additional color is to be introduced a separate print of one of the views (right-eye or left-eye view), with a different blocked-out area (and a separate plate reproduction of this particular blocked area) is made for each added color.

The addition of the color or colors is effected during and as a part of the final printing operation, each color being applied exclusively to the area in the final composite picture which corresponds with the area blocked out on one of the blocked prints. In printing, an impression, for example of the right-eye view in red, is made; the color plate, i. e., the plate for defining the position and extent of the added color, is then registered with the red printed impression; a printing of the added color is made on the area of the red print which corresponds with the color location on the color plate; and finally the left-eye view is printed in blue on the composite red and added-color impression, the red and blue impressions being but slightly out of register, to the extent required in making the composite superimposed pictures described in the hereinbefore-mentioned Macy patents.

As in the case of the composite superimposed stereoscopic picture produced by the method of the said Macy patents, without the introduction of additional color, the final composite picture obtained by my method is to be observed through red and blue color screens, filters or lenses. The resulting view is a third-dimensional view of the specimen substantially in black or gray, with a selected area standing out prominently in a color which contrasts with the main part or body of the picture and throws that particular area into unusually bold relief, so that the part which appears in the added color is emphasized and made prominent by the combined effect of the third-dimensional illustration and the contrasting color.

The matter of selection of the particular color or colors to be employed in thus effecting the introduction of added color into third-dimensional pictures is important. The color used must, in each instance, be one which is not filtered out by one of the color filters used in viewing the final picture. If the color is to be viewed with the right eye, for example, the red print should be used in making the drawing of the area to which the color is to be applied, for preparing that particular color plate. If the color is to be viewed with the left eye the blue print should be similarly used, the area to be made to appear in the added color being blocked out on that print.

By way of example, if it is desired that the nerves, in a picture portraying an anatomical or surgical specimen, appear in greenish-yellow, which color is well suited for use for this purpose in the composite red and blue composite picture, these nerves are accurately outlined in the right-eye red view; the outlined area is blocked with India ink; and the color, in the final printing, is applied to the proper area, as thus determined, to insure that the added color will not be filtered out by the blue right-eye viewing filter. If, on the other hand, a color is to be introduced (to identify and emphasize blood vessels or tendons, for example) which will not be filtered out by the red left-eye viewing filter, a print of the blue left-eye view is used for preparing a color plate for the different added color, in a manner similar to the preparation of the color plate for the greenish-yellow applied to the nerves in the red view.

Various colors may thus be used in areas selectively defined upon one or the other of the red or blue views, these colors, for example, including orange, yellow, green, purple and brown, each in several shades or tints.

One or more areas may be thus blocked out and subsequently colored, each with a different color, in either the right-eye view or the left-eye view, or in each. As explained above, each additional color introduced necessitates the making of a separate color plate therefor and a separate printing operation from each color plate, in the manner hereinbefore described.

The third-dimensional methods and pictures hereinbefore described are not limited in their applicability and usefulness to the production or use of views reproduced upon paper or other opaque or substantially opaque material. The composite third-dimenisonal pictures may be printed upon any properly prepared surface of any suitable material, whether opaque, translucent or transparent. For example, instead of opaque or substantially opaque paper, a transparent base, such as glass, transparent paper, Celluloid or Cellophane, may be used. The third-dimensional view may be produced on the transparent material by the above-mentioned Macy process, with the use of my added-color improvement. The composite third-dimensional print may then be placed between glass lantern slides and projected upon a screen in the usual manner. The projected picture, observed by an audience through colored eye filters, is seen as a third-dimensional view. The use of such third-dimensional pictures in the form of lantern slides, either in plain complementary colors or with the added color improvement hereinbefore described, is an important development of my invention and is especially useful as an optional feature of my method of third-dimensional portrayal of anatomy and surgery and similarly useful as an aid to exhibition, demonstration and instruction in dentistry, botany, geology and generally similar fields.

I claim:

1. The method of portraying anatomical and surgical specimens which consists in producing on a substantially flat sheet a composite third-dimensional picture by superimposing views in complementary colors of inner parts of the human body, said views depicting said parts as seen respectively by the right and left eyes of an observer, and applying to a selected area of said composite picture a color observable as such through a color screen of one of said complementary colors, said composite picture thus colored being viewable through screens of said complementary colors as a colored third dimensional picture of said parts.

2. The method of portraying anatomy, surgery and the like which consists in producing a third-dimensional picture of a specimen by superimposing views thereof in complementary colors, and applying to a selected area of one of said views a color observable as such through a color screen of one of said complementary colors, said picture, thus colored, being viewable through screens of said complementary colors as a colored third dimensional picture.

3. The method of producing third-dimensional pictures which comprises superimposing views of an object in complementary colors to produce a composite third-dimensional picture of said object, said views being taken from points spaced apart the proper interpupillary distance to afford a right-eye view and a left-eye view of said object, and applying to a selected area of said composite picture a color observable as such through a color screen of one of said complementary colors, said composite picture thus colored being viewable through filters of said complementary colors as a third dimensional picture whereon said selected area will appear in said applied color.

4. The method of producing third-dimensional pictures which consists in taking two views of an object respectively from points spaced apart substantially the interpupillary distance, making an impression of one of said views in one of two complementary colors, making an impression of the other of said views in the other complementary color, superimposing different added colors upon different portions of said view-impressions and superimposing one of said impressions thus colored upon the other, said added colors being colors observable as such when seen through viewing filters of said complementary colors.

5. The method of producing third-dimensional pictures which consists in taking two views of an object respectively from points spaced apart substantially the interpupillary distance, applying to a selected area of one of said views an added color, making an impression of the other of said views upon an impression of said view with said added color, said view-impressions being respectively in complementary colors and said added color being a color observable as such when seen through viewing filters of said complementary colors.

6. The method of producing third-dimensional pictures which consists in taking two views of an object respectively from points spaced apart substantially the interpupillary distance, making an impression of one of said views in one of two complementary colors, applying to a selected area of said view an added color, superimposing upon said impression thus colored an impression of the other of said views in the other of said complementary colors, and applying to a selected area of said other view an added color, each of said added colors being such as will be observable as such and as a color contrasting with said complementary colors when seen through viewing filters of said complementary colors.

7. A third-dimensional picture comprising superimposed views taken respectively from points spaced apart substantially the interpupillary distance and each printed in one of two complementary colors, one of said views having applied to a selected area thereof a color different from said complementary colors and observable as a color different from said complementary colors and contrasting with said views when seen through viewing filters of said complementary colors.

8. A third-dimensional picture comprising superimposed views taken respectively from points spaced apart substantially the interpupillary distance and each printed in one of two complementary colors, each of said views having applied to a selected area thereof a color different from said complementary colors and observable as a color contrasting with said complementary colors and with the composite view when seen through viewing filters of the colors of said superimposed views respectively.

9. A third-dimensional lantern slide comprising superimposed right-eye and left-eye views each printed in one of two complementary colors upon transparent substantially flat material, a selected portion of the area of said lantern slide being printed in a color observable as such and as contrasting with said complementary colors when viewed through filters of said complementary colors.

10. A third-dimensional picture comprising superimposed right-eye and left-eye views each printed in one of two complementary colors, portions of the area of said picture being printed in different colors contrasting with said complementary colors and observable as such through viewing filters of said complementary colors.

11. A third-dimensional picture comprising superimposed right-eye and left-eye views in complementary colors respectively, a portion of the area of said picture having applied thereto a color contrasting with the color of said picture as seen through viewing filters of said complementary colors.

LOUIS P. GOOD.

REFERENCES CITED

The following references are of record in the file of this patent:

UNITED STATES PATENTS

| Number | Name | Date |
| --- | --- | --- |
| 1,104,067 | Murayama | July 21, 1914 |
| 1,533,437 | Macy | Apr. 14, 1925 |

FOREIGN PATENTS

| Number | Country | Date |
| --- | --- | --- |
| 104,069 | Great Britain | 1917 |

OTHER REFERENCES

"Commercial Engraving and Printing," Hackleman, 1921, pages 231–235.